(12) United States Patent
Joos et al.

(10) Patent No.: US 7,432,008 B2
(45) Date of Patent: Oct. 7, 2008

(54) GAS DIFFUSION LAYER FOR AN ELECTROCHEMICAL CELL

(75) Inventors: Nathaniel Ian Joos, Toronto (CA); David Frank, Scarborough (CA)

(73) Assignee: Hydrogenics Corporation, Mississauga, Ontario (CA)

( * ) Notice: Subject to any disclaimer, the term of this patent is extended or adjusted under 35 U.S.C. 154(b) by 427 days.

(21) Appl. No.: 10/729,384

(22) Filed: Dec. 8, 2003

(65) Prior Publication Data
US 2004/0151969 A1    Aug. 5, 2004

Related U.S. Application Data (60) Provisional application No. 60/431,235, filed on Dec. 6, 2002.

(51) Int. Cl.
  H01M 8/02    (2006.01)
  H01M 8/10    (2006.01)
  H01M 4/94    (2006.01)

(52) U.S. Cl. ............... 429/35; 429/38; 429/44

(58) Field of Classification Search ........... 429/35, 429/38, 44
See application file for complete search history.

(56) References Cited

U.S. PATENT DOCUMENTS

| | | | |
|---|---|---|---|
| 6,020,083 A * | 2/2000 | Breault et al. | 429/36 |
| 6,057,054 A * | 5/2000 | Barton et al. | 429/42 |
| 6,270,636 B1 | 8/2001 | Byron, Jr. et al. | |
| 6,423,194 B1 | 7/2002 | Furuya | |
| 7,087,339 B2 * | 8/2006 | Wald et al. | 429/35 |
| 7,201,987 B2 * | 4/2007 | Sugita et al. | 429/35 |
| 2001/0004050 A1 | 6/2001 | Byron, Jr. et al. | |
| 2001/0044042 A1 | 11/2001 | Inoue et al. | |
| 2002/0051902 A1 | 5/2002 | Suenaga et al. | |
| 2002/0094464 A1 | 7/2002 | Wangerow | |
| 2003/0072988 A1 * | 4/2003 | Frisch et al. | 429/36 |
| 2003/0118889 A1 * | 6/2003 | Smith | 429/36 |
| 2004/0053099 A1 * | 3/2004 | Franklin et al. | 429/30 |

FOREIGN PATENT DOCUMENTS

| | | | |
|---|---|---|---|
| EP | 1341249 | | 9/2003 |
| JP | 2000182639 A | * | 6/2000 |
| JP | 2003007328 | | 1/2003 |
| WO | 02/093669 | | 11/2002 |
| WO | 02/089240 | | 11/2003 |

\* cited by examiner

*Primary Examiner*—Gregg Cantelmo (57) ABSTRACT

An electrochemical cell includes: a membrane electrode assembly: first and second reactant flow field plates for providing first and second reactant flow fields disposed on either side of the membrane electrode assembly. A first seal is disposed between the first reactant flow field plate and the membrane electrode assembly for impeding leakage of process fluids of the electrochemical cell. A first gas diffusion layer is disposed between the first reactant flow field plate and the membrane electrode assembly for diffusing reactant from the first reactant flow field to the membrane electrode assembly. The gas diffusion layer provides a peripheral support structure for supporting the membrane electrode assembly at a periphery between the first reactant flow field and the first seal to impede substantial distortion of the membrane electrode assembly between the first reactant flow field and the first seal.

10 Claims, 6 Drawing Sheets

GAS DIFFUSION LAYER FOR AN ELECTROCHEMICAL CELL

FIELD OF THE INVENTION

This invention relates to an electrochemical cell. More particularly, this invention relates to a gas diffusion layer for an electrochemical cell and a method of making such a gas diffusion layer.

BACKGROUND OF THE INVENTION

Electrochemical cells are energy conversion devices and usually are used to collectively indicate fuel cells and electrolyzer cells. Fuel cells have been proposed as a clean, efficient and environmentally friendly power source that has various applications. A conventional proton exchange membrane (PEM) fuel cell includes an anode, a cathode, and a selective electrolytic membrane disposed between the two electrodes. A fuel cell generates electricity by bringing a fuel gas (typically hydrogen) and an oxidant gas (typically oxygen) respectively to the anode and the cathode. In reaction, a fuel such as hydrogen is oxidized at the anode to form cations (protons) and electrons by the reaction $H_2=2H^++2e-$. The proton exchange membrane facilitates the migration of protons from the anode to the cathode while preventing the electrons from passing through the membrane. As a result, the electrons are forced to flow through an external circuit thus providing an electrical current. At the cathode, oxygen reacts with electrons returned from the electrical circuit to form anions. The anions formed at the cathode react with the protons that have crossed the membrane to form liquid water as the reaction by-product following $\frac{1}{2}O_2+2H^-+2e-=H_2O$.

On the other hand, an electrolyzer uses electricity to electrolyze water to generate oxygen from its anode and hydrogen from its cathode. Similar to a fuel cell, a typical solid polymer water electrolyzer (SPWE) or proton exchange membrane (PEM) electrolyzer includes an anode, a cathode and a proton exchange membrane disposed between the two electrodes. Water is introduced to, for example, the anode of the electrolyzer which is connected to the positive pole of a suitable direct current voltage. Oxygen is produced at the anode by the reaction $H_2O=\frac{1}{2}O_2+2H^-+2e-$. The protons then migrate from the anode to the cathode through the membrane. On the cathode which is connected to the negative pole of the direct current voltage, the protons conducted through the membrane are reduced to hydrogen according to the equation $2H++2e-=H_2$.

A typical electrochemical cell employing PEM comprises an anode flow field plate, a cathode flow field plate, and a membrane electrode assembly (MEA) disposed between the anode and cathode flow field plates. Each reactant flow field plate has an inlet region, an outlet region, and open-faced channels to fluidly connect the inlet to the outlet, and provide a way for distributing the reactant gases to the outer surfaces of the MEA. The MEA comprises a PEM disposed between an anode catalyst layer and a cathode catalyst layer A first gas diffusion layer (GDL) is disposed between the anode catalyst layer and the anode flow field plate, and a second GDL is disposed between the cathode catalyst layer and the cathode flow field plate. The GDLs facilitate the diffusion of the reactant gas, either the fuel or oxidant, to the catalyst surfaces of the MEA. Furthermore, the GDLs enhance the electrical conductivity between each of the anode and cathode flow field plates and the electrodes.

One of the questions that have to be answered in the design of such electrochemical cells is how to ensure the MEA works properly while preventing leakage of process fluids. This almost always involves proper support of the MEA when the electrochemical cell stack is assembled Extensive efforts have been made in this regard. However, these efforts have been focused on design changes of reactant flow field plates, which are complicated and expensive Compromise has to be made in these designs and hence this often results in the substitution of one problem for another.

SUMMARY OF THE INVENTION

In accordance with a first aspect of the present invention, there is provided an electrochemical cell comprising: (a) a membrane electrode assembly; (b) a first reactant flow field plate for providing a first reactant flow field disposed on one side of the membrane electrode assembly; (c) a first seal disposed between the first reactant flow field plate and the membrane electrode assembly for impeding leakage of process fluids of the electrochemical cell; (d) a first gas diffusion layer disposed between the first reactant flow field plate and the membrane electrode assembly for diffusing reactant from the first reactant flow field to the membrane electrode assembly; (e) a second reactant flow field plate for providing a second reactant flow field disposed on the other side of the membrane electrode assembly; and, (f) a peripheral support structure for supporting the membrane electrode assembly at a periphery between the first reactant flow field and the first seal to impede substantial distortion of the membrane electrode assembly between the first reactant flow field and the first seal.

In accordance with a second aspect of the present invention, there is provided a method of impeding leakage of process fluids from an electrochemical cell having a membrane electrode assembly, a first reactant flow field plate for providing a first reactant flow field disposed on one side of the membrane electrode assembly, a seal disposed between the first reactant flow field plate and the membrane electrode assembly for impeding leakage of process fluids of the electrochemical cell, and a second reactant flow field plate for providing a second reactant flow field disposed on the other side of the membrane electrode assembly. The method comprises (a) providing a gas diffusion layer disposed between the first reactant flow field and the membrane electrode assembly; and, (b) providing the gas diffusion layer with an edge portion for supporting the membrane electrode assembly at a periphery between the reactant flow field and the seal to impede substantial distortion of the membrane electrode assembly between the reactant flow field and the seal.

In accordance with a third aspect of the present invention, there is provided a gas diffusion layer for an electrochemical cell. The gas diffusion layer comprises a first side for receiving process fluids of the electrochemical cell; a second side opposite to the first side; a porous body for diffusing the process fluids from the first side to the second side, the porous body being electrically conductive, and an edge portion surrounding the porous body, wherein the edge portion is substantially impermeable to the process fluids.

In accordance with a fourth aspect of the present invention, there is provided a gas diffusion layer for an electrochemical cell. The gas diffusion layer comprising a first side for receiving process fluids of the electrochemical cell; a second side opposite to the first side; a porous body for diffusing the process fluids from the first side to the second side, the porous body being electrically conductive, and, an edge portion surrounding the porous body, wherein a thickness of the edge portion is reduced from one side of the porous body to provide a step between the porous body and the edge portion.

BRIEF DESCRIPTION OF THE DRAWINGS

For a better understanding of the present invention, and to show more clearly how it may be carried into effect, reference will now be made to the accompanying drawings which show, by way of example, preferred embodiments of the present invention, and in which.

DETAILED DESCRIPTION OF THE INVENTION

The present invention relates to gas diffusion layers for electrochemical cells. Hereinafter, the present invention will be described in detail by taking a PEM fuel cell as an example. It Is to be understood that the present invention has applications not limited to PEM fuel cells, but rather any type of electrochemical cells, such as electrolyzers Referring first to FIG. 1, this shows an exploded perspective view of a single fuel cell unit 100 located within a fuel cell stack according to the present invention. It is to be understood that while a single fuel cell unit 100 is detailed below, in known manner the fuel cell stack will usually comprise a plurality of fuel cells stacked together. Each fuel cell of the fuel cell unit 100 comprises an anode flow field plate 120, a cathode flow field plate 130, and a membrane electrode assembly (MEA) 124 disposed between the anode and cathode flow field plates 120, 130. Each reactant flow field plate has an inlet region, an outlet region, and open-faced channels to fluidly connect the inlet to the outlet, and provide a way for distributing the reactant gases to the outer surfaces of the MEA 124. The MEA 124 comprises a solid electrolyte (i.e. a proton exchange membrane) 125 disposed between an anode catalyst layer (not shown) and a cathode catalyst layer (not shown). A first gas diffusion layer (GDL) 122 is disposed between the anode catalyst layer and the anode flow field plate 120, and a second GDL 126 is disposed between the cathode catalyst layer and the cathode flow field plate 130. The GDLs 122, 126 facilitate the diffusion of the reactant gas, either the fuel or oxidant, to the catalyst surfaces of the MEA 124. Furthermore, the GDLs are electrically conductive and thereby enhance the electrical conductivity between each of the anode and cathode flow field plates 120, 130 and the MEA 124.

Figure 1:
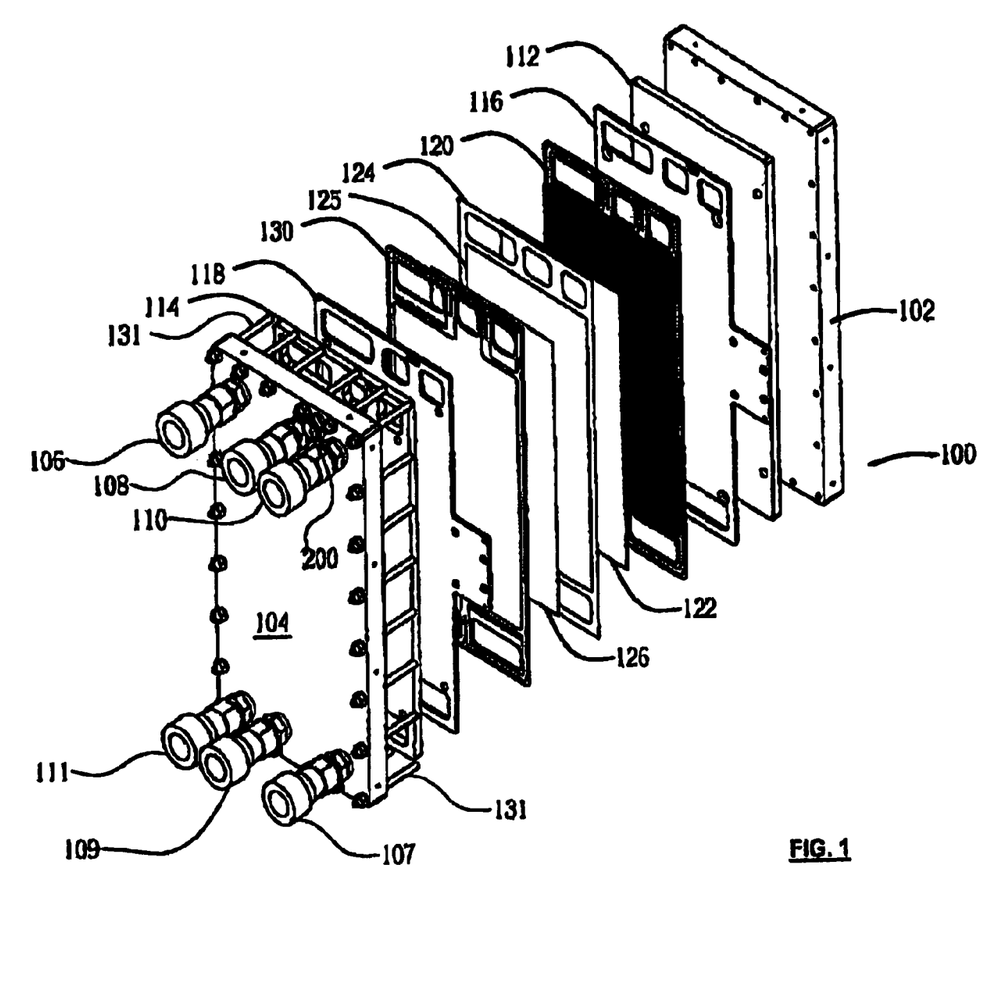
FIG. 1 shows an exploded perspective view of an electrochemical cell unit located within an electrochemical cell stack.

Still referring to FIG. 1, hereinafter the designations "front" and "rear" with respect to the anode and cathode flow field plates 120, 130 indicate their orientation with respect to the MEA 124. Thus, the "fronts" face indicates the side facing towards the MEA 124, while the "rear" face indicates the side facing away from the MEA 124. A first current collector plate 116 abuts against the rear face of the anode flow field plate 120. Similarly, a second current collector plate 118 abuts against the rear face of the cathode flow field plate 130. The current collector plates 116, 118 collect the current from the flow field plates 120, 130, and are connected to an external electrical circuit (not shown). First and second insulator plates 112, 114 are located immediately adjacent the first and second current collector plates 116, 118, respectively. First and second end plates 102, 104 are located immediately adjacent the first and second insulator plates 112, 114, respectively. Pressure may be applied on the end plates 102, 104 to press the unit 100 together. Moreover, sealing means are usually provided between each pair of adjacent plates. Preferably, a plurality of tie rods 131 may also b provided. The tie rods 131 are screwed into threaded bores in the anode endplate 102, and pass through corresponding plain bores in the cathode endplate 104. In known manner, fastening means, such as nuts, bolts, washers and the like are provided for clamping together the fuel cell unit 100 and the entire fuel cell stack Still referring to FIG. 1, the endplate 104 is provided with a plurality of connection ports for the supply of various fluids. Specifically, the second endplate 104 has first and a second air connection ports 106, 107, first and second coolant connection ports 108, 109, and first and second hydrogen connection ports 110, 111. As will be understood by those skilled in the art, the MEA 124, the anode and cathode flow field plates 120, 130, the first and second current collector plates 116, 118, the first and second insulator plates 112, 114, and the first and/or second end plates 102, 104 have three inlets near one end and three outlets near the opposite end thereof, which are in alignment to form fluid ducts for air as an oxidant, a coolant, and hydrogen as a fuel. Also, it is not essential that all the outlets be located at one end, i.e., pairs of flows could be counter current as opposed to flowing in the same direction. Although not shown, it will be understood that the various ports 106–111 are fluidly connected to ducts that extend along the length of the fuel cell unit 100.

Figure 2:
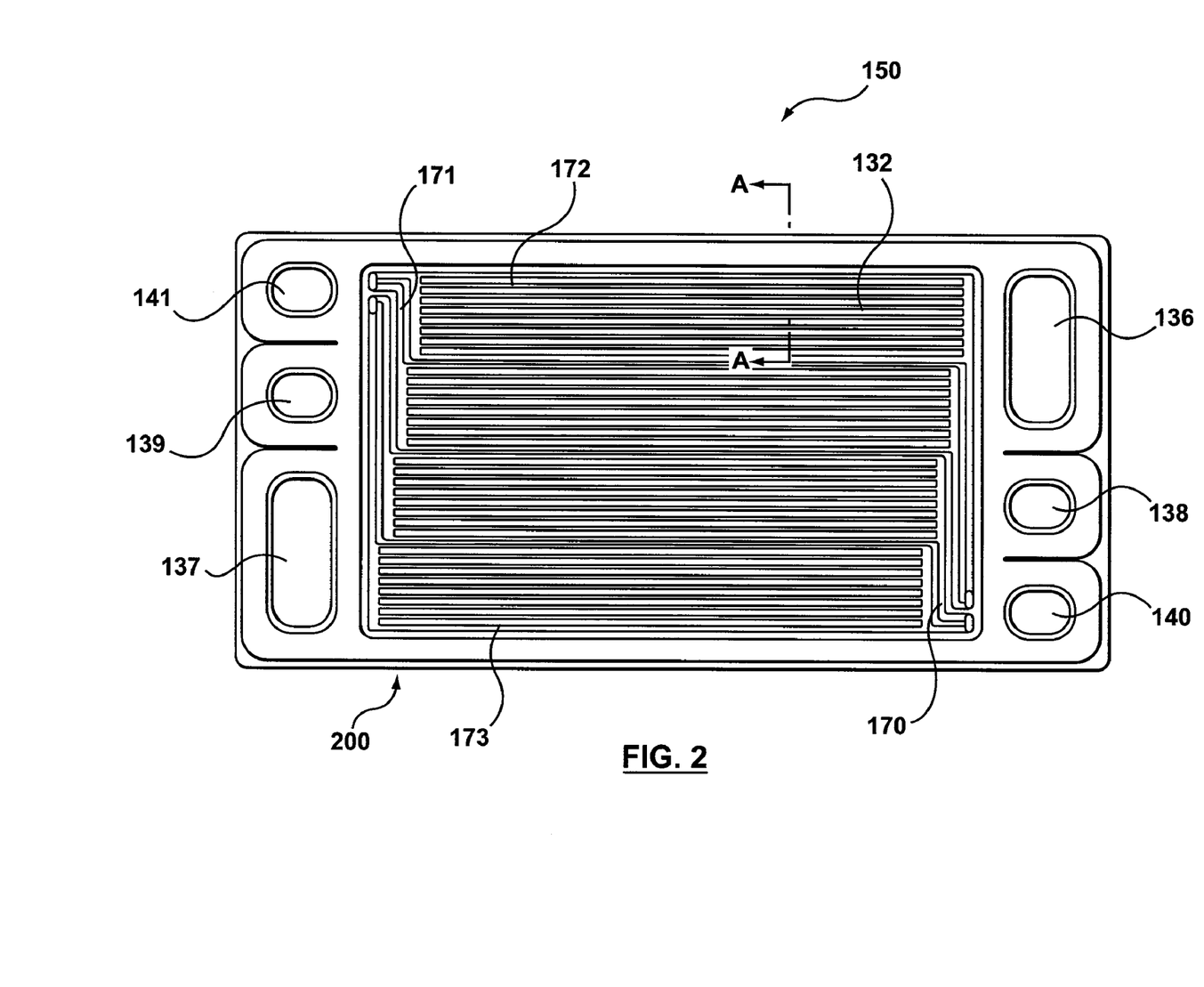
FIG. 2 shows a schematic view of the front face of a flow field plate of an electrochemical cell.

Referring now to FIG. 2, there is illustrated in a schematic view, the front face of a flow field plate 150. It is to be understood that this only illustrates an example of a flow field plate which forms no part of the present invention. The flow field plate 150 as shown can be either an anode flow field plate or a cathode flow field plate. The flow field plate 150 has three apertures near one end thereof, namely an air inlet aperture 136, a coolant inlet aperture 138, and a hydrogen inlet aperture 140, in fluid communication with the first air connection port 106, the first coolant connection port 108, and the first hydrogen connection port 110, respectively. The flow field plate 150 has three apertures near the opposite end, namely an air outlet aperture 137, a coolant outlet aperture 139 and a hydrogen outlet aperture 141, in fluid communication with the second air connection port 107, the second coolant connection port 109, and the second hydrogen connection port 111, respectively.

In FIG. 2, the front face of the flow field plate 150 is provided with a reactant flow field 132 comprising a plurality of open-faced channels. For illustration only, this reactant flow field 132 fluidly connects the hydrogen inlet aperture 140 to the hydrogen outlet aperture 141 and hence can be referred to as hydrogen flow field. It can be understood that the reactant flow field 132 may alternatively be an air flow field that fluidly connects the air inlet aperture 136 to the air outlet aperture 137. As is known to those skilled in the art, when reactant flows along the channels in the flow field 132, at least a portion of the reactant diffuses across the first or second GDL 122 or 126 and reacts at the respective catalyst layer of the MEA. The excess reactant continues to flow along the reactant flow field 132, and ultimately exits the flow field plate 150 via the associated reactant outlet aperture, in this example, hydrogen outlet aperture 141.

Still referring to FIG. 2, a seal 200 is provided around the reactant flow field 132 and the various inlets and outlets to prevent leaking or mixing of reactant gases and coolant. The seal, usually a gasket made of resilient materials compatible with a fuel cell environment, is seated in a seal groove (not shown) provided on the front face of the reactant flow field plate 150; The seal 200 is formed such that it completely encloses the flow field 132 and the inlet and outlet apertures, permitting a reactant to only flow from associated inlet aperture to outlet aperture. The gasket seals between adjacent plates when the fuel cell stack is assembled Although not shown, it is known to those skilled in the art that the rear face of the reactant flow field plate 150 is usually provided with coolant flow field that fluidly connects the coolant inlet aperture 138 to the coolant outlet aperture 139. Similarly, seal gasket can be provided on the rear face of the reactant flow field plate 150. The first and second GDLs 122 and 126 typically cover the flow field, i.e. the active area of respective anode and cathode flow field plates 120 and 130, as shown in FIG. 1, to facilitate the diffusion of reactants.

Similarly, PEM electrolyzers may employ similar design to that described above. Specifically, PEM electrolyzers also have flow field plates, MEA, GDLs, end plates and terminal plates corresponding to current collector plate of fuel cells that conduct current between the electrochemical cell and external circuit. In electrolyzers, the reactant is water and the products are hydrogen on cathode and oxygen on anode. On the anode, the gas diffusion layer enables the diffusion of the process water to the surface of the MEA, the diffusion of the product gas (oxygen) away from the surface of the MEA and provides conduction of electricity between the anode flow field plate and the MEA. On the cathode, the gas diffusion layer enables the diffusion of the product gas (hydrogen) away from the surface of the MEA and provides conduction of electricity between the cathode flow field plate 32 and the MEA. In electrolyzer application, the configuration may be slightly different. Electrolyzer flow fields may not have a cathode inlet and only a cathode outlet, as hydrogen emerges from cathode without introducing any fluid directly into the cathode side thereof.

Figure 3:
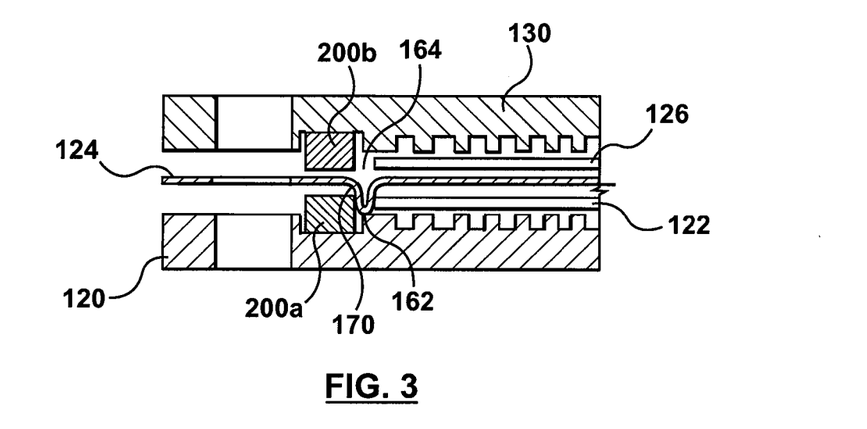
FIG. 3 shows a schematic sectional view through part of an electrochemical cell stack incorporating a prior art gas diffusion layer.

Now, reference will be made to FIG. 3, which shows a schematic sectional view through part of an electrochemical cell stack incorporating a prior art gas diffusion layer. FIG. 3 shows the anode flow field plate 120, the first gas diffusion layer 122, the MEA 124, the second gas diffusion layer 126 and the cathode flow field plate 130, stacked one on top of another. The anode flow field plate 120 is provided with a first seal gasket 200a enclosing the anode flow field and the cathode flow field plate 130 is provided with a second seal gasket 200b enclosing the cathode flow field. As aforementioned, apertures on the anode flow field plate 120, the cathode flow field plate 130 and the MEA align to form a reactant duct throughout the electrochemical cell stack. In existing electrochemical cell stacks, the first and second gas diffusion layers 122 and 126 substantially cover the active areas, i.e. open-channels of the associated flow field plates, and hence do not extend to the duct formed by these apertures. Since the seal gaskets 200a and 200b usually protrude from the front face of anode and cathode flow field plates 120 and 130 respectively, a gap 162 is formed between the end of the first gas diffusion layer 122 and the first seal gasket 200a. Similarly, a gap 164 is formed between the end of the second gas diffusion layer 126 and the second seal gasket 200b. During operation of the electrochemical cell, pressure of the reactant gases or product gases on one side of the MEA 124 may not be the same as that on the other side Therefore, the MEA 124 will be forced to distort into one of the gaps 162 and 164. In FIG. 3, for illustration only, a distorted portion 170 of MEA 124 is formed in the gap 162. This reduces the lifespan of MEA and leads to lower efficiency and eventually leakage of reactants or products.

Figure 4:
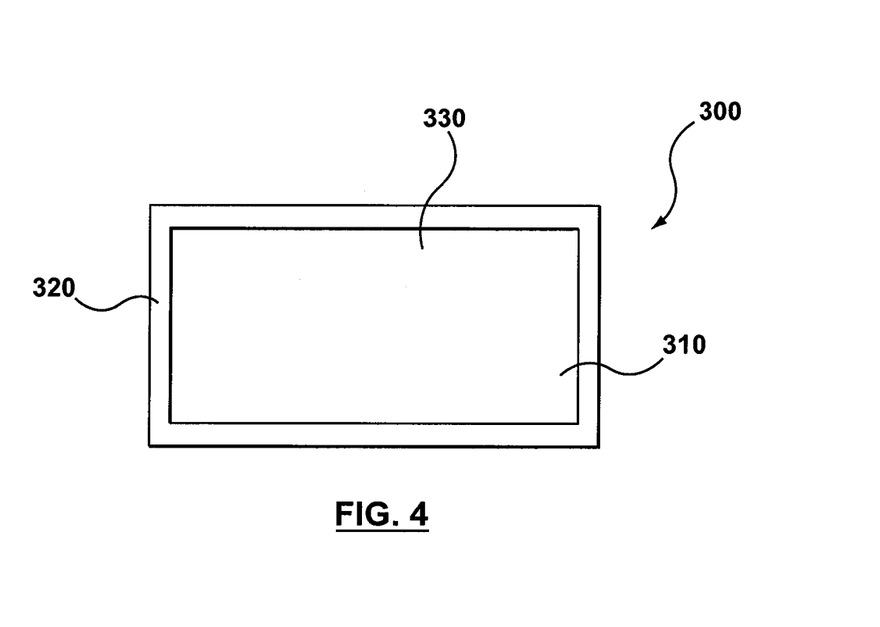
FIG. 4 shows a front elevational view of a gas diffusion layer according to a first embodiment of the present invention.
Figure 5:
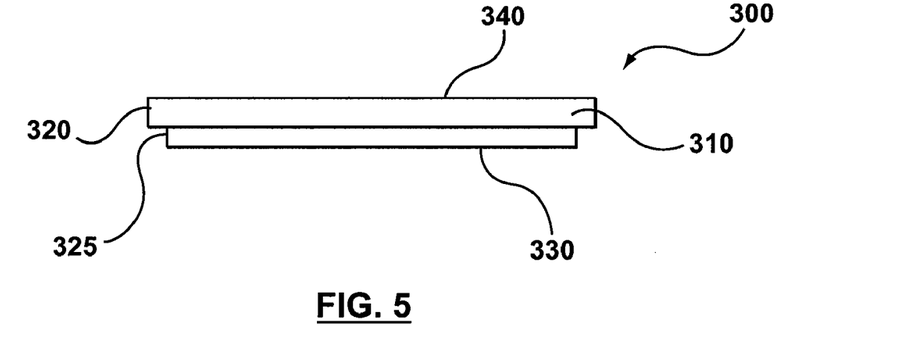
FIG. 5 shows a side elevational view of the gas diffusion layer of FIG. 4.

FIGS. 4 and 5 show a gas diffusion layer 300 according to the first embodiment of the present invention. As is known to those skilled in the art, the gas diffusion layer 300 is made of porous materials, for example, Carbon Felts, paper and cloth, allowing fluids to pass therethrough. When used in electrolyzer cells, a typical material is sintered metal. The present gas diffusion layer 300 is provided with a central portion 310 and an edge portion 320 having reduced thickness. One side 340 of the gas diffusion layer 300 is flat and the other side 330 has a step 325 around the central portion 310.

Figure 6:
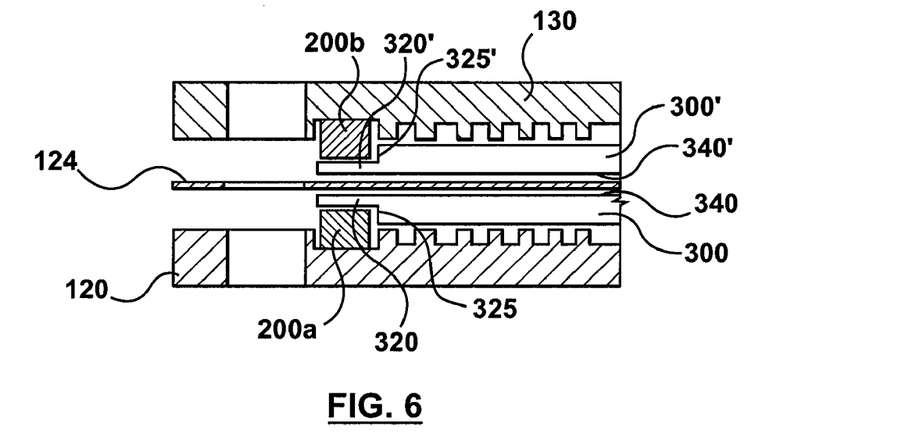
FIG. 6 shows a schematic sectional view through part of an electro chemical cell stack incorporating the gas diffusion layer of a first embodiment of the present invention.

Referring to FIG. 6, there is illustrated in a schematic sectional view an electrochemical cell stack incorporating first and second gas diffusion layers 300 and 300'. For clarity, analogous elements between the electrochemical cell stacks of FIGS. 3 and 6 are denoted by the same numerals. As can be seen in FIG. 6, the first and second gas diffusion layers 300 and 300' are respectively disposed between anode flow field plate 120 and MEA 124, and the cathode flow field plate 130 and the MEA 124. Similar to the designation used for flow field plates, the "front" and "rear" faces of the first and second gas diffusion layers 300 and 300' are respectively used to indicate faces of the gas diffusion layers facing towards and away from the MEA 124. The front faces 340 and 340' are the flat faces of the associated gas diffusion layers 300 and 300' respectively. Each of the edge portions 320 and 320' of the gas diffusion layers 300 and 300' overlaps corresponding seal gasket 300a and 300b such that each of the steps 325 and 325' abuts against the seal gasket 300a and 300b, respectively. Therefore, when the electrochemical cell stack is assembled and compressed, the MEA 124 is properly supported on both sides in the active area, i.e. the area corresponding to the reactant flow field of each reactant flow field plate 120 or 130.

As can be appreciated by those skilled in the art, the edge portions 320 and 320' have to be impermeable to reactant or product fluids to prevent leakage of these fluids. Further, a seal must be formed between the top surface of the edge portions 320 and 320' and the MEA 124 In contrast, the area of the gas diffusion layer 300 corresponding to the active area of flow field plates has to be permeable to process fluids for electrochemical cells. This can be achieved by compressing the edge of the porous material to form physically compressed and hence impermeable portion 320. Commonly used gas diffusion layers comprise sintered metal, carbon cloth, and other similar materials. Only the porous portions of the gas diffusion layers need be electrically conductive. These materials usually can be physically compressed to obtain impermeable, reduced thickness portions. Other methods of providing non-porous portion may also be used, such as joining non-porous materials to the edge of porous material. However, compressing is a simple and inexpensive technique.

Figure 7:
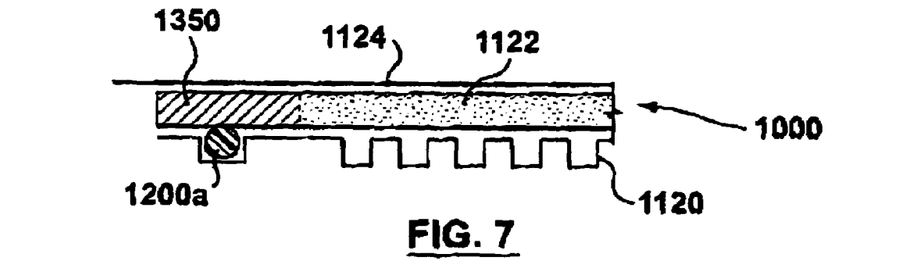
FIG. 7 shows a schematic view of an electrochemical cell stack in accordance with a second embodiment of the present invention.
Figure 8:
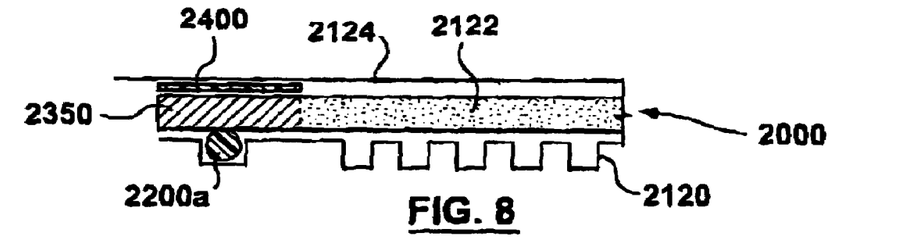
FIG. 8 shows a schematic view of an electrochemical cell stack in accordance with a third embodiment of the present invention.

Referring to FIG. 7, there is illustrated, in a schematic sectional view, an electrochemical cell stack 1000 comprising a gas diffusion layer 1122 in accordance with a second embodiment of the invention. For clarity, analogous elements of the electrochemical cell stack of FIG. 3 and that of FIG. 7 are denoted by the same numerals, but with 1000 added to the reference numerals of the electrochemical cell stack 1000 of FIG. 7. As shown in FIG. 7, in accordance with the second embodiment of the present invention, the gas diffusion layer 1122 extends beyond the seal gasket 1200a. Although the edge portion 1350 surrounding the central portion has the same thickness as the central portion, as in the first embodiment, the edge portion 1350 is impermeable to process fluids for electrochemical cells. Again, this can be done by compressing the porous material used to manufacture the gas diffusion layer to eliminate the pores. Since the front face of the gas diffusion layer 1122 of this embodiment is flat, the MEA 1124 is properly supported. The impermeable edge portion 1350 together with the seal gasket 1200a seal the process fluids from leaking Referring to FIG. 8, there is illustrated in a schematic sectional view, an electrochemical cell stack 2(000 comprising a gas diffusion layer 2122 in accordance with a third embodiment of the invention. For clarity, analogous elements of the electrochemical cell stack 1000 of FIG. 7 and the electrochemical cell stack 2000 of FIG. 8 are denoted by the same numerals, but with 1000 added to the reference numerals of the electrochemical cell stack 2000 of FIG. 8. The structure and operation of the electrochemical cell stack 2000 of FIG. 8 is analogous to that of FIG. 7 except as described below. For brevity, the description of FIG. 7 is not repeated with respect to FIG. 8. In the cell stack 2000 of FIG. 8, a silk screened gasket (or other thin gasket material) 2400 is added on the edge portion 2350 of the gas diffusion layer 2122 on the front face thereof. This further improves the sealing between the MEA 2124 and the front face of the edge portion 2350. In other respects, the gas diffusion layer 2122 of FIG. 8 resembles the gas diffusion layer 1122 of FIG. 7.

Figure 9:
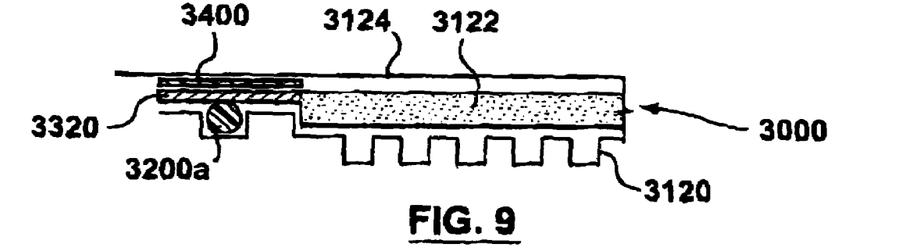
FIG. 9 shows a schematic view of an electrochemical cell stack in accordance with a fourth embodiment of the present invention.

Referring to FIG. 9, there is illustrated in a schematic sectional view, an electrochemical cell stack 3000 comprising a gas diffusion layer 3122 in accordance with a fourth embodiment of the invention. For clarity, analogous elements of the electrochemical cell stack 1000 of FIG. 7 and the electrochemical cell stack 3000 of FIG. 9 are denoted by the same reference numerals, but with 2000 added to the reference numerals of the electrochemical cell stack 3000 of FIG. 9. The structure and op ration of the electrochemical cell stack 3000 of FIG. 9 is analogous to that of FIG. 7 except as described below. For brevity, the description of FIG. 7 is not repeated with respect to FIG. 9.

In the cell stack 3000 of FIG. 9, the edge portion 3320 is compressed with a silk screened gasket 3400 added on the front face thereof. As with the edge portion 2350 of the gas diffusion layer 2122 of the electrochemical cell stack 2000 of FIG. 8, the addition of the silk screened gasket 3400 further improves the sealing between an MEA 3124 and the front face of the edge portion 3320. However, unlike the edge portions 1350 and 2350 of the gas diffusion layers 1122 and 2122 of FIGS. 7 and 8 respectively, the edge portion 3320 of the electrochemical cell stack 3000 is compressed, similar to the edge portions 320 and 320' of FIG. 6.

Figure 10:
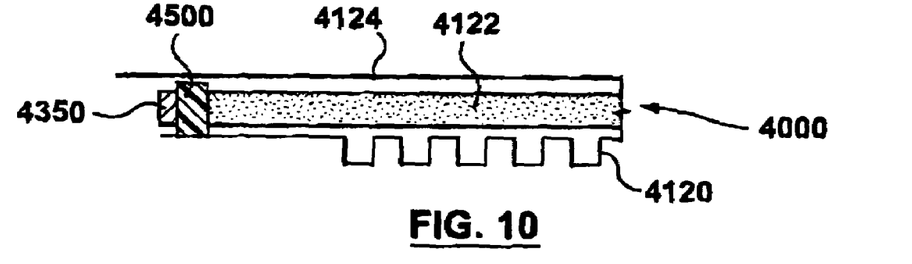
FIG. 10 shows a schematic view of an electrochemical cell stack in accordance with a fifth embodiment of the present invention.

Referring to FIG. 10, there is illustrated in a schematic sectional view, an electrochemical cell stack 4000 comprising a gas diffusion layer 4122 in accordance with a fifth embodiment of the invention. For clarity, analogous elements between the electrochemical cell stack 1000 of FIG. 7 and the electrochemical cell stack 4000 of FIG. 10 are denoted by the same numerals, but with 3000 added to the reference numerals of the electrochemical cell stack 4000 of FIG. 10. The structure and operation of the electrochemical cell stack 4000 of FIG. 10 is analogous to that of FIG. 7 except as described below. For brevity, the description of FIG. 7 is not repeated with respect to FIG. 10.

The cell stack 4000 of FIG. 10 includes a gas diffusion layer 4122 that is flat on both the front and rear faces. The edge portion 4350 and central portion are all porous. Liquid silicone material is injected onto the edge portion 4350, to form an integral silicone gasket 4500. The integral silicone gasket 4500 protrudes from the front and rear faces of the gas diffusion layer 4122 and forms a seal between a MEA 4124 and the gas diffusion layer 4122, and between a reactant flow field plate 4120 and the gas diffusion layer 4122.

Figure 11:
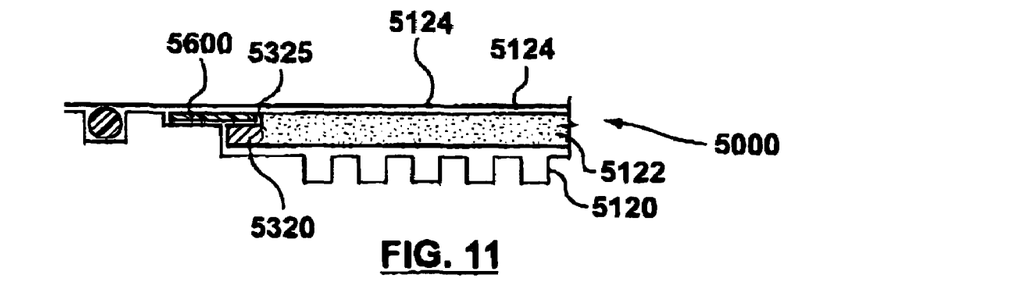
FIG. 11 shows a schematic view of an electrochemical cell stack in accordance with a sixth embodiment of the present invention.

Referring to FIG. 11, there is illustrated in a schematic sectional view, an electrochemical cell stack 5000 comprising a gas diffusion layer 5122 and a sealing insert 5600 in accordance with a sixth embodiment of the invention. For clarity, analogous elements between the electrochemical cell stack 1000 of FIG. 7 and the electrochemical cell stack 5000 of FIG. 11 are denoted by the same numerals, but with 4000 added to the reference numerals of the electrochemical cell stack 5000 of FIG. 11. The structure and operation of the electrochemical cell stack 5000 of FIG. 11 is analogous to that of FIG. 7 except as described below. For brevity, the description of FIG. 7 is not repeated with respect to FIG. 11.

The gas diffusion layer 5122 of the cell stack 5000 of FIG. 11 comprises an edge portion 5320 with reduced thickness, similar to the first and fourth embodiments shown in FIGS. 6 and 9 respectively. A step 5325 of the gas diffusion layer 5122 faces towards a MEA 5124 when the gas diffusion layer 5122 is disposed within the electrochemical cell 5000. The sealing insert 5600 is attached onto the edge portion 5320 and abuts against the step 5325. The sealing insert 5600 extends beyond the end face of the gas diffusion layer 5122 and has a thickness substantially the same as the height of the step 5325 to provide a substantially flat surface to support MEA 5124. The sealing insert 5600 can be a metal ring bonded onto the edge portion 5320. In this case, the sealing insert 5600 is configured such that the end face of the metal ring substantially aligns with the end face of the gas diffusion layer 5122 so as to properly support the MEA 5124. That is, the sealing insert 5600 is configured such that the MEA 5124 is fully supported and does not collapse into a gap formed around the edge seal as shown in FIG. 3. In the embodiment of FIG. 11, the sealing insert 5600 need not seal at all, as the seal itself is outboard of the sealing insert 5600.

Figure 12:
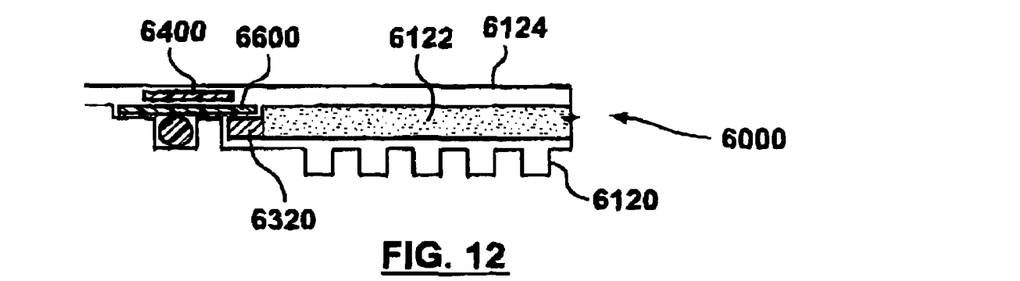
FIG. 12 shows a schematic view of an electrochemical cell stack in accordance with a seventh embodiment of the present invention.

Referring to FIG. 12, there is illustrated in a schematic sectional view, an electrochemical cell stack 6000 in accordance with a seventh embodiment of the invention. For clarity, analogous elements of the electrochemical cell stack 5000 of FIG. 11 and the electrochemical cell stack 6000 of FIG. 12 are denoted by the same numerals, but with 1000 added to the reference numerals of the electrochemical cell stack 6000 of FIG. 12. The structure and operation of the electrochemical cell stack 6000 of FIG. 12 is analogous to that of FIG. 11 except as described below.

As with the electrochemical cell stack 5000, the electrochemical cell stack 6000 of FIG. 12 comprises a sealing insert 6600 provided on an edge portion 6320 of a gas diffusion layer 6122. The edge portion 6320 has a reduced thickness similar to the edge portion 5320 of FIG. 11 such that the gas diffusion layer 6122 with the sealing insert 6600 provides a substantially flat surface for supporting the MEA 6124. In addition, a silk screened gasket 6400 is provided on the sealing insert 6600 to improve the sealing between a MEA 6124 and the sealing insert 6600. In this embodiment, and in contrast to the cell stack 5000 of FIG. 11, the sealing insert 6600 is used to provide a seal as well as to support the MEA 6124.

Figure 13:
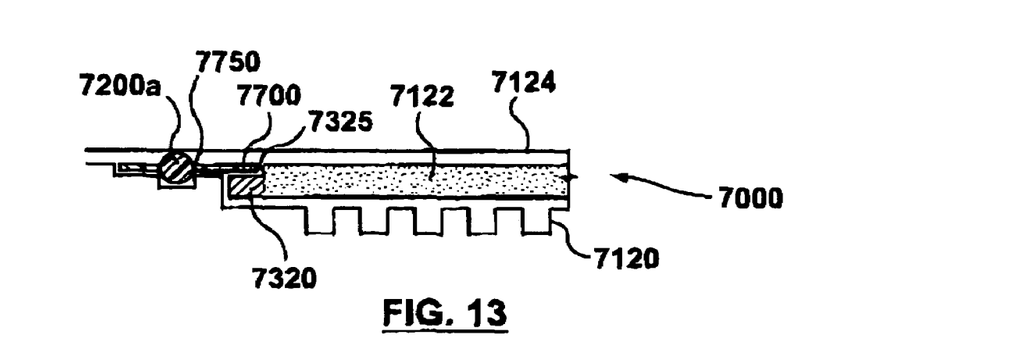
FIG. 13 shows a schematic view of an electrochemical cell stack in accordance with an eighth embodiment of the present invention; and, FIG. 14 shows a schematic view of an electrochemical cell stack in accordance with a ninth embodiment of the present invention

Referring to FIG. 13, there is illustrated in a schematic sectional view, an electrochemical cell stack 7000 in accordance with an eighth embodiment of the present invention. For clarity, analogous elements between the electrochemical cell stack 6000 of FIG. 12 and the electrochemical cell stack 7000 of FIG. 13 are denoted by the same numerals, but with 1000 added to the reference numerals of the electrochemical cell stack 7000 of FIG. 13. The structure and operation of the electrochemical cell stack 7000 of FIG. 13 is analogous to that of FIG. 12 except as described below. For brevity, the description of FIG. 12 is not repeated with respect to FIG. 13.

The electrochemical cell stack 7000 of FIG. 13 comprises a sealing insert 7700 provided adjoining an edge portion 7320 of a gas diffusion layer 7122. A conventional sealing gasket 7200a can be disposed in a slot 7750 and provides a seal between a flow field plate 7120 and a MEA 7124. Although not shown, it can be appreciated that the sealing insert 7700 surrounds a step 7325 where the thickness of the gas diffusion layer 7122 is reduced at the edge portion 7320. Hence, the sealing insert 7700 is a loop.

Depending on the configuration of the flow field plate, the edge portion of the gas diffusion layer may or may not be impermeable to process fluids for electrochemical cells. In the embodiments shown in FIGS. 11–13, the end face of the edge portion engages the flow field plate and then an additional sealing insert is provided that overlaps this juncture of the end face of the edge portion with the flow field plate. Hence, it is not necessary for the edge portion to be impermeable. However, when used together with flow field plates having other configurations, it may be necessary for the edge portion to be impermeable.

Figure 14:
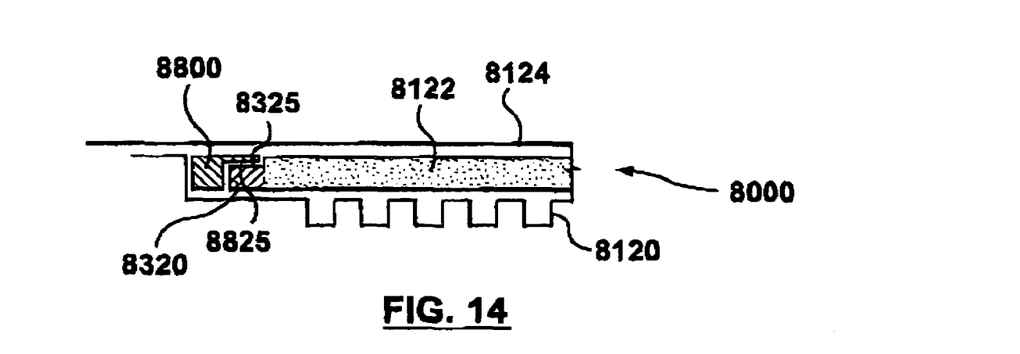

Referring to FIG. 14, there is illustrated in a schematic sectional view, an electrochemical cell stack 8000 in accordance with a ninth embodiment of the present invention. For clarity, analogous elements between the electrochemical cell stack 5000 of FIG. 11 and the electrochemical cell stack 8000 of FIG. 14 are denoted by the same numerals, but with 3000 added to the reference numerals of the electrochemical cell stack 8000 of FIG. 14. The structure and operation of the electrochemical cell stack 8000 of FIG. 14 is analogous to that of FIG. 11 except as described below. For brevity, the description of FIG. 11 is not repeated with respect to FIG. 14.

The electrochemical cell stack 8000 comprises a sealing insert 8800. This sealing insert 8800 includes a step 8825. Gas diffusion layer 8122 includes an edge 8320 of reduced thickness, which edge 8320 defines a step 8325 at which the thickness of the gas diffusion layer 8122 is reduced. The steps 8325 and 8825 are configured to engage one another such that the sealing insert 8800 aligns with the step 8325 and edge 8320 of the gas diffusion layer 8122. Again, as with the embodiments of FIGS. 11 to 13, as the sealing member 8800 provides a complete seal between flow field plate 8120 extending from a flow field plate 8120 to a MEA 8124, the edge portion 8320 of gas diffusion layer 8122 need not be impermeable. Given the thickness of the sealing insert 8800, the flow field plate 8120 need not have a raised containment edge around the perimeter of the active area. The sealing insert 8800 includes a sealing material between its bottom surface and the flow field plate 8120 (not shown) and optionally may include a sealing material between its top surface and the MEA 8124 (as in FIGS. 8, 9 and 12)

It should be appreciated that the spirit of the present invention is concerned with the novel structure of the gas diffusion layer and its application in electrochemical cells. The design of flow field on the reactant flow field plate, and structure of end plates, current collector plates do not form part of the present invention Moreover, the present invention is applicable to various types of fuel cells and electrolyzers. For example, in case of fuel cell, the fuel may not be pure hydrogen and the oxidant may not be air. In case of electrolyzer, the reactant may not be pure water. But rather it can be tap water or water solution of other substance.

It is to be anticipated that those having ordinary skill in this art can make various modification to the embodiments disclosed herein. However, these modifications should be considered to fall under the protection scope of the invention as defined in the following claims.

The invention claimed is:

1. An electrochemical cell comprising:
a membrane electrode assembly;
a first reactant flow field plate for providing a first reactant flow field disposed on one side of the membrane electrode assembly;
a first seal disposed between the first reactant flow field plate and the membrane electrode assembly for impeding leakage of process fluids of the electrochemical cell;
a first gas diffusion layer disposed between the first reactant flow field plate and the membrane electrode assembly for diffusing reactant from the first reactant flow field to the membrane electrode assembly, the first gas diffusion layer including:
a first side facing the first reactant flow field plate and a second side facing the membrane electrode assembly;
a porous body for diffusing the reactant from the reactant flow field to the membrane electrode assembly; and
an edge portion surrounding the porous body, the edge portion abutting the first seal and the membrane electrode assembly;
wherein on the first side of the first gas diffusion layer a thickness of the edge portion is reduced in relation to the porous body to provide a step between the porous body and the edge portion, the step for engaging the first seal; and
wherein the first seal has a thickness corresponding with a height of the step, such that the second side of the first gas diffusion layer provides a substantially flat surface for supporting the membrane electrode assembly to impede substantial distortion of the membrane electrode assembly at the first seal.

2. The electrochemical cell of claim 1, further comprising a sealing insert provided on the edge portion to impede leakage of the process fluids.

3. The electrochemical cell of claim 2, wherein the seal is a sealing gasket and the sealing insert comprises a slot for accommodating the sealing gasket.

4. The electrochemical cell of claim 3, wherein the sealing insert has a thickness substantially equal to a thickness of the porous body and has an insert step for engaging the step on the gas diffusion layer.

5. The electrochemical cell of claim 4, wherein the sealing insert is substantially impermeable to the process fluids.

6. The electrochemical cell of claim 5, wherein the sealing insert comprises a silk screened gasket.

7. A method of impeding leakage of process fluids from an electrochemical cell, the electrochemical cell including a membrane electrode assembly, a first reactant flow field plate for providing a first reactant flow field disposed on one side of the membrane electrode assembly, a seal disposed between the first reactant flow field plate and the membrane electrode assembly for impeding leakage of process fluids of the electrochemical cell, and a second reactant flow field plate for providing a second reactant flow field disposed on the other side of the membrane electrode assembly, the method comprising:

provining a gas diffusion layer disposed between the first reactant flow field plate and the membrane electrode assembly; and providing the gas diffusion layer with an edge portion for supporting the membrane electrode assembly at a periphery between the first reactant flow field plate and the seal to impede substantial distortion of the membrane electrode assembly between the first reactant flow field plate and the seal;

wherein the edge portion surrounds a porous body, the porous being permeable to the process fluids, the edge portion is thinner than the porous body, the porous body comprises a first side and a second side, the thickness of the edge portion is reduced on the second side to provide a step on the second side, and the gas diffusion layer is installed such that the first side faces the membrane electrode assembly and the step on the second side faces and engages the seal, and wherein the seal has an insert thickness substantially equal to a height of the step and the method further comprises installing the seal and the gas diffusion layer such that the second side of the gas diffusion layer provides a substantially flat surface for supporting the membrane electrode assembly.

8. The method as defined in claim 7, wherein the edge portion is substantially impermeable to process fluids.

9. The method as defined in claim 7, wherein the edge portion comprises a liquid silicone gasket for impeding leakage of the process fluids.

10. The method as defined in claim 7, wherein the edge portion comprises a silk screened gasket for impeding leakage of the process fluids.

* * * * *